US008972519B2

(12) United States Patent
Attanasio et al.

(10) Patent No.: US 8,972,519 B2
(45) Date of Patent: Mar. 3, 2015

(54) OPTIMIZATION OF MULTIMEDIA SERVICE OVER AN IMS NETWORK

(75) Inventors: Luisa Attanasio, Moliterno (IT); Giancarlo Carbone, Rome (IT); Giuseppe Ciano, Rome (IT); Francesco Lecciso, Rome (IT); Luigi Pichetti, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 12/908,110

(22) Filed: Oct. 20, 2010

(65) Prior Publication Data
US 2011/0119388 A1    May 19, 2011

(30) Foreign Application Priority Data

Nov. 16, 2009   (EP) ..................................... 09176136

(51) Int. Cl.
*G06F 15/16*    (2006.01)
*G06F 9/50*    (2006.01)
(Continued)

(52) U.S. Cl.
CPC .......... *G06F 9/5055* (2013.01); *H04L 65/1063* (2013.01); *H04L 67/24* (2013.01);
(Continued)

(58) Field of Classification Search
CPC ..... H04W 4/02; H04L 67/24; H04L 65/1016; H04L 65/1063; H04L 67/101; G02B 21/367; G06F 17/30017; G06F 2009/4557; G06F 8/63; G06F 9/5077; A63F 13/12
USPC ............... 709/227, 219, 238, 231; 455/404.2, 455/456.1; 370/401; 717/115, 178, 168, 717/120
See application file for complete search history.

(56) References Cited

U.S. PATENT DOCUMENTS

| 7,272,403 B2 * | 9/2007 | Creamer et al. ........... 455/456.1 |
| 2004/0046655 A1 * | 3/2004 | Benes et al. ............... 340/539.1 |

(Continued)

FOREIGN PATENT DOCUMENTS

| JP | 2000-276425 A | 10/2000 |
| JP | 2002-091843 A | 3/2002 |

(Continued)

OTHER PUBLICATIONS

3GPP TS 23.228 V10.3.1 (Jan. 2011) 3rd Generation Partnership Project; Technical Specification Group Services and System Aspects; IP Multimedia Subsystem (IMS); Stage 2 (Release 10) 274 pages (Jan. 2011).

*Primary Examiner* — Thuong Nguyen
(74) *Attorney, Agent, or Firm* — Ingrid Foerster; Edell, Shapiro & Finnan, LLC

(57) ABSTRACT

Predetermined multimedia services are provided to a plurality of users through a IP Multimedia Subsystem (IMS). A request is received at a placement server of a multimedia service by at least one user, and the placement server retrieves on a presence server information about the at least one user. The placement server identifies application servers including a multimedia application capable of providing the requested multimedia service, and the placement server selects an application server that is located a minimum average distance from at least one user. In response to the minimum average distance being greater than a predetermined threshold, a local application server is selected with an average distance from the user that is less than the predetermined threshold. A virtual image of the multimedia application is created on the selected local application server, and a connection is established between the user and the selected local application server.

14 Claims, 4 Drawing Sheets

(51) Int. Cl.
  *H04L 29/06* (2006.01)
  *H04L 29/08* (2006.01)
(52) U.S. Cl.
  CPC ........... *H04L 67/306* (2013.01); *H04L 67/101* (2013.01); *H04L 67/1021* (2013.01); *H04L 67/1002* (2013.01); *H04L 65/1016* (2013.01)
  USPC ........... 709/217; 709/219; 709/238; 709/227; 709/231; 455/404.2; 455/456.1; 370/401; 717/115; 717/178; 717/168; 717/120

(56) References Cited

U.S. PATENT DOCUMENTS

| | | | | |
|---|---|---|---|---|
| 2006/0218544 | A1* | 9/2006 | Chakraborty et al. | 717/168 |
| 2006/0229058 | A1* | 10/2006 | Rosenberg | 455/404.2 |
| 2006/0239534 | A1* | 10/2006 | Sumida et al. | 382/133 |
| 2007/0242066 | A1* | 10/2007 | Levy Rosenthal | 345/419 |
| 2007/0261045 | A1* | 11/2007 | Gujarathi et al. | 717/168 |
| 2008/0234592 | A1* | 9/2008 | Lim et al. | 600/509 |
| 2008/0247400 | A1* | 10/2008 | Schoettle | 370/401 |
| 2009/0241092 | A1* | 9/2009 | Yang et al. | 717/115 |
| 2009/0300076 | A1* | 12/2009 | Friedman et al. | 707/203 |
| 2009/0300604 | A1* | 12/2009 | Barringer | 717/178 |
| 2010/0042235 | A1* | 2/2010 | Basso et al. | 700/94 |
| 2010/0107163 | A1* | 4/2010 | Lee | 718/1 |
| 2010/0223610 | A1* | 9/2010 | Dehaan et al. | 717/178 |
| 2010/0250765 | A1* | 9/2010 | Riggert et al. | 709/231 |

FOREIGN PATENT DOCUMENTS

| | | |
|---|---|---|
| JP | 2002-143559 | 5/2002 |
| JP | 2003006071 A | 1/2003 |
| JP | 2003-216519 A | 7/2003 |
| JP | 2004-280281 A | 10/2004 |
| JP | 2005-063234 A | 3/2005 |

* cited by examiner

OPTIMIZATION OF MULTIMEDIA SERVICE OVER AN IMS NETWORK

BACKGROUND

1. Technical Field

The present invention relates to the field of digital networks, more particularly to a method and system for optimization of multimedia services over IMS (IP Multimedia Subsystem) Networks.

2. Discussion of the Related Art

FIG. 1A schematically represents a traditional network environment that supports individual services. In this environment, services tend to be provided in an arrangement that is like vertical silos.

SUMMARY OF THE INVENTION

In an example embodiment in accordance with the invention, a method is described for providing predetermined multimedia services to a plurality of users through a IP Multimedia Subsystem (IMS). The IMS comprises a presence server that maintains information about the plurality of users, where the information about the plurality of users includes a position of each user. The IMS further comprises a plurality of application servers, where each application server includes at least one multimedia application configured to provide at least one multimedia service, and a placement server that has access to a repository containing information about the plurality of application servers and the associated multimedia applications, the information about the plurality of application servers and the associated multimedia applications including a position of each application server. The method comprises receiving a request at the placement server of a multimedia service by at least one of the plurality of users, the placement server retrieving on the presence server information about the at least one user, and the placement server identifying application servers including a multimedia application capable of providing the requested multimedia service, the placement server selecting an application server that is located a minimum average distance from the at least one user. In response to the minimum average distance being greater than a predetermined threshold, a local application server is selected with an average distance from the at least one user that is less than the predetermined threshold, a virtual image of the multimedia application is created on the selected local application server, and a connection is established between the at least one user and the selected local application server.

In another example embodiment of the present invention, an IP Multimedia Subsystem (IMS) for providing multimedia services to a plurality of users comprises a presence server that maintains information about the plurality of users, where the information about the plurality of users includes the position of each user, a plurality of application servers, where each application server includes at least one multimedia application configured to provide at least one multimedia service, a repository that includes information about the plurality of application servers and the associated multimedia applications, where the information about the plurality of application servers and the associated multimedia applications includes a position of each application server, and a placement server that has access to the repository and the presence server and is further configured such that, upon receipt of a request of a multimedia service by at least one of the plurality of users. The placement server is configured to identify application servers capable of providing the requested multimedia service, select which of the identified application servers is located a minimum average distance from the at least one user, responsive to such minimum average distance being greater than a predetermined threshold, select a local application server with an average distance from the at least one user that is less than the predetermined threshold, and create a virtual image of the multimedia application on the selected local application server. The IMS further comprises a network configured to establish a connection between the at least one user and the selected application server.

In another example embodiment of the present invention, a computer program product is provided for performing a method of providing predetermined multimedia services to a plurality of users through an IP Multimedia Subsystem (IMS). The IMS comprises a presence server to maintain information about the plurality of users, the information about the plurality of users including a position of each user, a plurality of application servers, each application server including at least one multimedia application configured to provide at least one multimedia service, and a placement server that has access to a repository containing information about the plurality of application servers and the associated multimedia applications, the information about the plurality of application servers and the associated multimedia applications including a position of each application server. The computer program product comprises a computer readable storage medium having computer readable program code embodied therewith, the computer readable program code configured to execute a method on a data processing system, where the method comprises the placement server receiving a request of a multimedia service by at least one of the plurality of users, the placement server retrieving on the presence server information about the at least one user, the placement server identifying application servers including a multimedia application capable of providing the requested multimedia service, the placement server selecting the application server having a minimum average distance from the at least one user, responsive to the minimum average distance being greater than a predetermined threshold, selecting a local application server with an average distance from the at least one user that is less than the predetermined threshold, creating a virtual image of the multimedia application on the selected local application server, and establishing a connection between the at least one user and the selected application server.

The above and further features and advantages of embodiments of the present invention will become apparent from the following detailed description thereof, when taken in conjunction with the attached drawings wherein like reference numerals in the various figures are utilized to designate like components.

DETAILED DESCRIPTION

IP Multimedia Subsystem (IMS) is a set of specifications that describes the Next Generation Networking (NGN) architecture for implementing IP based telephony and multimedia services, over combined wired/wireless networks.

Figure 1B:
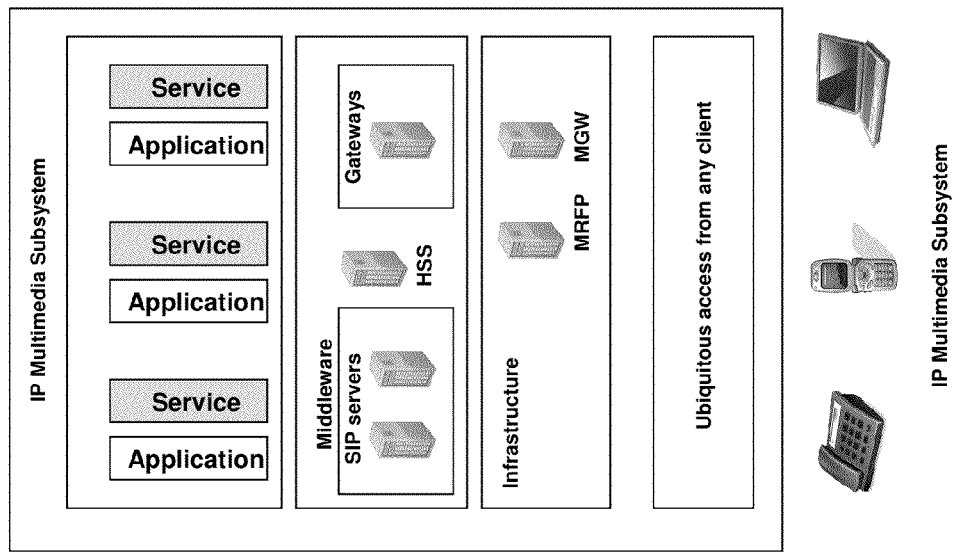
FIGS. 1A and 1B show an example embodiment of an IP Multimedia Subsystem architecture in accordance with the present invention compared to a traditional architecture.
Figure 1A:
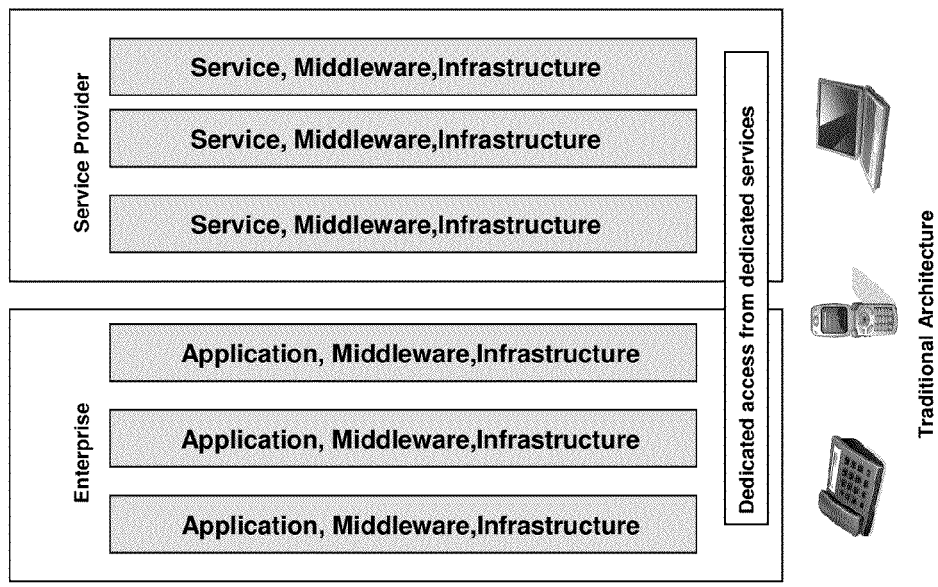

IMS is a substantial evolution with respect to the traditional network environment that supported individual services. Rather then being based on the traditional network-tailored hardware (HW) and software (SW) solutions, which tended to silo implementations of Providers' Services, IMS (see FIG. 1B) is based on open standards and common middleware. In particular, the IMS top logical layer, known as Service Plane, is based on a variety of components that includes Multimedia Server, Application Servers that host specific IMS Applications and Application Enablers, like Presence Server and XDMS (i.e. XML Document Management Server which is able to manage XML documents of any type in an application and service-independent way).

In particular, the Presence Server provides the service that allows a user to be informed about the reachability, availability and willingness to communicate with another user. Furthermore, the presence service allows users to give details of their communication means and capabilities (e.g., whether they have capabilities such as audio, video, instant messaging, etc. and in which terminal those capabilities are present). The entity (person or system) that is providing presence information to the Presence Server is called presentity. A given presentity has several devices known as Presence User Agents (PUA) which provide information about their presence: for example a SIP Phone, a laptop or a PDA are PUAs.

Presence information may be used by other entities that want to communicate with the presentity. The other entities are called watchers. Watchers can be notified about changes in the presence information.

Planes in the IMS host servers/applications, such as the following:

A service plane hosts services/applications, for example multi-gaming applications, that are used by the users connected to the IMS network and that can be implemented in virtualization environments.

A control plane hosts Media Servers. By definition, a media server is a device that simply stores and shares media using a network connection with enough speed to allow access to that media. Depending on the uses and applications that it runs, a media server may require large amounts of RAM, or a powerful, multicore CPU.

In state of the art IMS networks, the collocation of the IMS service plane elements and Media Servers need not be related to presence information in order to optimize resource consumption (e.g., by avoiding unnecessary or unwanted network congestions) in IMS Service and Control planes, where such optimization conserves resources, energy and traffic.

Figure 2:
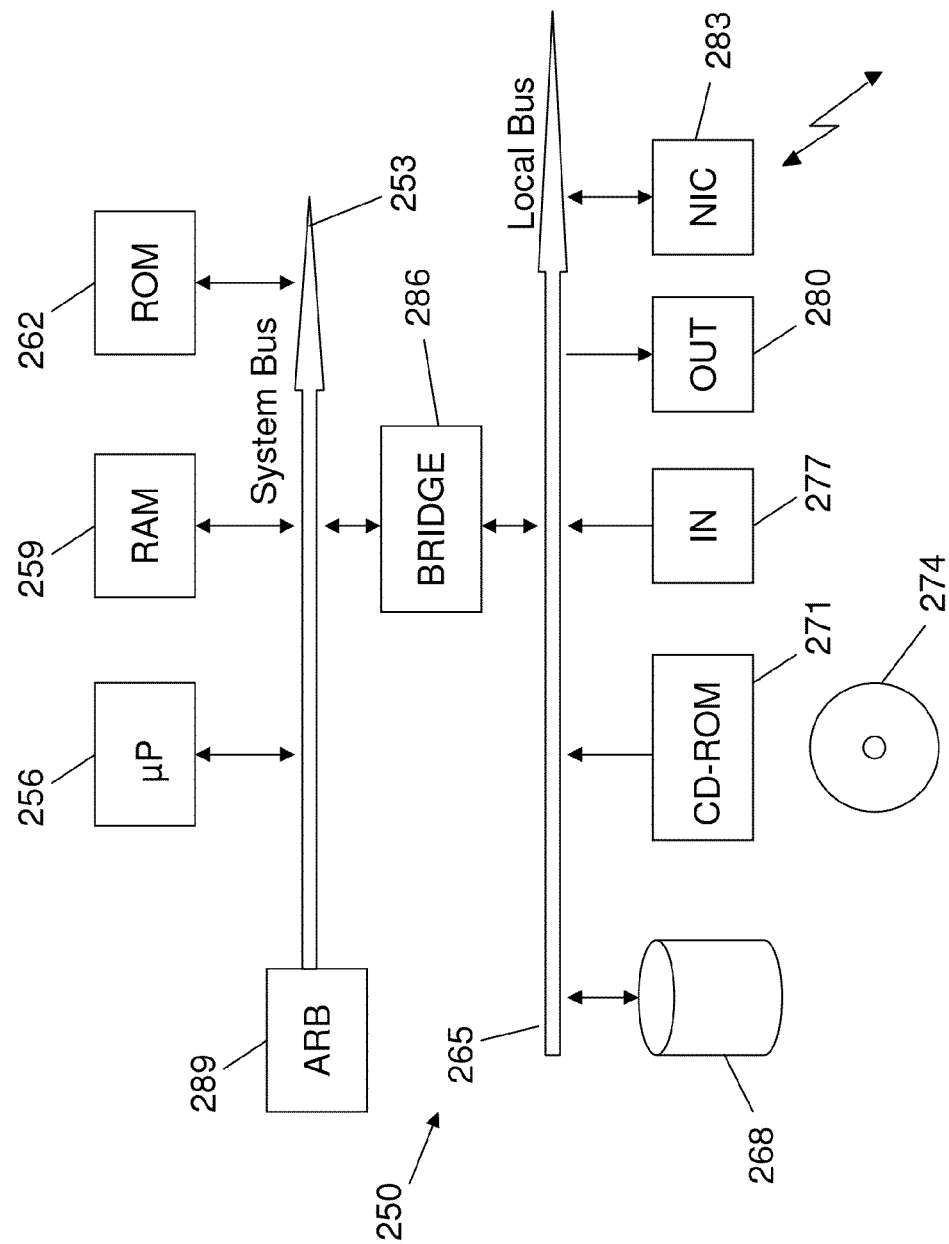
FIG. 2 is a diagram of a general computer system adapted to support the method of an example embodiment of the present invention.

With reference to FIG. 2, a generic computer of the system (e.g. computer, Internet server, router, remote servers) is denoted by reference number 250. The computer 250 is formed by several units that are connected in parallel to a system bus 253. In detail, one or more microprocessors 256 control operation of the computer 250; a RAM 259 is directly used as a working memory by the microprocessors 256, and a ROM 262 stores basic code for a bootstrap of the computer 250. Peripheral units are clustered around a local bus 265 (via respective interfaces). In particular, a mass memory includes of a hard-disk 268 and a drive 271 for reading CD-ROMs 274. Moreover, the computer 250 includes input devices 277 (for example, a keyboard and a mouse), and output devices 280 (for example, a monitor and a printer). A Network Interface Card 283 is used to connect the computer 250 to the network. A bridge unit 286 interfaces the system bus 253 with the local bus 265. Each microprocessor 256 and the bridge unit 286 can operate as master agents requesting an access to the system bus 253 for transmitting information. An arbiter 289 manages the granting of the access with mutual exclusion to the system bus 253. Similar considerations apply where the system has a different topology, or it is based on other networks. Alternatively, the computers can have a different structure, include equivalent units, or have other data processing entities (such as PDAs, mobile phones, and the like).

An example embodiment of the present invention exploits the advantages provided by the IP Multimedia Subsystem (IMS) architecture. IMS is a set of requirements and specifications defined by $3^{rd}$ Generation Partnership Project (3GPP) and $3^{rd}$ Generation Partnership Project 2 (3GPP2). These two projects were formed through collaboration agreements which involved a number of regional telecommunication standard bodies (e.g. European Telecommunications Standards Institute, Association of Radio Institute and Businesses/Telecommunication Technology Committee (ARIB/TTC) (Japan), China Communications Standards Association, Alliance for Telecommunications Industry Solutions (North America) and Telecommunications Technology Association (South Korea)). IMS defines a unifying architecture for IP-based services over both packet and circuit switched networks. It enables the convergence of different wireless and fixed access technologies for the creation, delivery and consumption of multimedia services. IMS also supports services integration through standardized reference points (akin to interfaces and protocols), which not only makes service creation faster and easier, but also leverages the services available through Internet technologies such as Web Services. One of the objectives of IMS is the ability to develop and deploy services as quickly as possible. The IMS architecture is designed to enable this capability by providing an environment which is in contrast to the traditional vertically silo network environment that supported individual services. On the other hand, the single converged network environment created by IMS aims at eliminating multiplicity of services by enabling sharing of services across the different functionality planes thereby reducing cost and creating better user experience.

The following are some examples of IP based multimedia services which could be delivered to users through an IP Multimedia Subsystem network:

Multiplayer games;
Push to talk;
Video chat;
Conferencing;
Instant messaging.

Multimedia services are provided by multimedia applications which are available on application servers. In accordance with an example embodiment of the present invention, it is possible to improve the efficiency of such a network by providing and managing IMS services (in particular, but not exclusively, gaming services) based on IMS workload and the position of the users connected, exploiting information about user location and users' device capabilities (e.g. in terms of bandwidth and distance).

Figure 3:
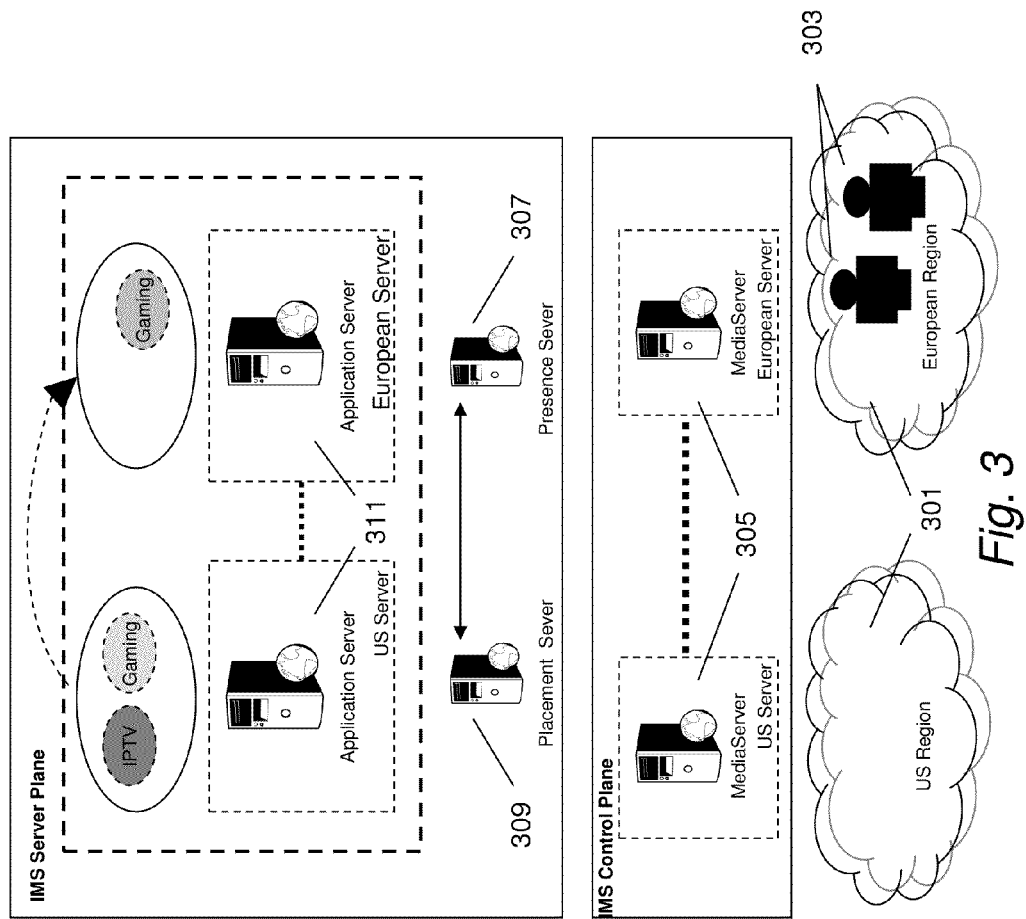
FIG. 3 is a block diagram of an example network system according in accordance with the present invention.

FIG. 3 schematically shows a system according to an example embodiment of the present invention. In the example shown in FIG. 3, two Regions 301 are represented: a US Region and a European Region (however, it is noted that other possible geographic location could also be used). Two users 303 (User A and User B) are both connected to an IMS Network from European Region through Media Server 305. Information about the users A and B were previously stored on a Presence Server 307 as mentioned above. The system also includes a Placement Server 309 which has the function of ensuring that Virtual Applications are available and set up when requested by connected users. Moreover, it determines which is the best virtual environment to allocate the IMS applications and Media Server based on the current users that are connected and using it. Placement Server 309 also includes a repository of all available multimedia applications throughout the whole IMS network and all necessary information for accessing such information and for setting up a virtual environment for installing/moving a virtual image of such application on different servers. A plurality of Application Servers 311 can be physically placed in different Regions (e.g., a European and a US Region of the present example). Each Application Server contains a number of multimedia applications which can be accessed by any user connected to the IMS network, where each multimedia application can provide one or more multimedia services. Following this example, if the Users A and B desired to connect to a multimedia application for accessing a multimedia service (e.g., a gaming service to start a game session), they could connect through the local Media Server 305 and the Placement Server 309 to any Application Server 311. However, it would be much more efficient for the requested application to be available on a Server in the European Region. According to an example embodiment of the present invention, the Placement Server 309 retrieves presentity information from the Presence Server. Such presentity information can include one or more of the following:

users' device type;
users' capabilities (e.g., whether the user has audio, video, and/or instant messaging devices);
bandwidth for user connection;
communication "distance" (e.g., the number of proxy servers) between users connected from a specific zone and the IMS deployed service;
billing information related to IMS service
QoS (Quality of Service) associated to the service.

Using such collected information, the Placement Server 309 can determine which is the best virtual environment to allocate the IMS applications and Media Server based on the current users that are connected. In the example of FIG. 3, a scenario might exist in which the Placement Server 309 receives the request by Users A and B through Media Server 305 of a specific Gaming application which is available on the Server 311 in the US Region.

The decision regarding how to arrange the virtual environment and the selection of the best placement for the previously selected IMS elements can be based on several different parameters and properties including, without limitation, the following examples:

Maximum number of users connected from a specific zone;
Average communication bandwidth for the users connected from a specific zone;
Average Communication "distance" (e.g., the number of proxy servers or the geographical distance between server) between the users connected from a specific zone and the IMS deployed service, in general the "distance" parameter can be representative of any kind of distance, either topological (i.e. depending on the network configuration and topology) or physical.

Figure 4:
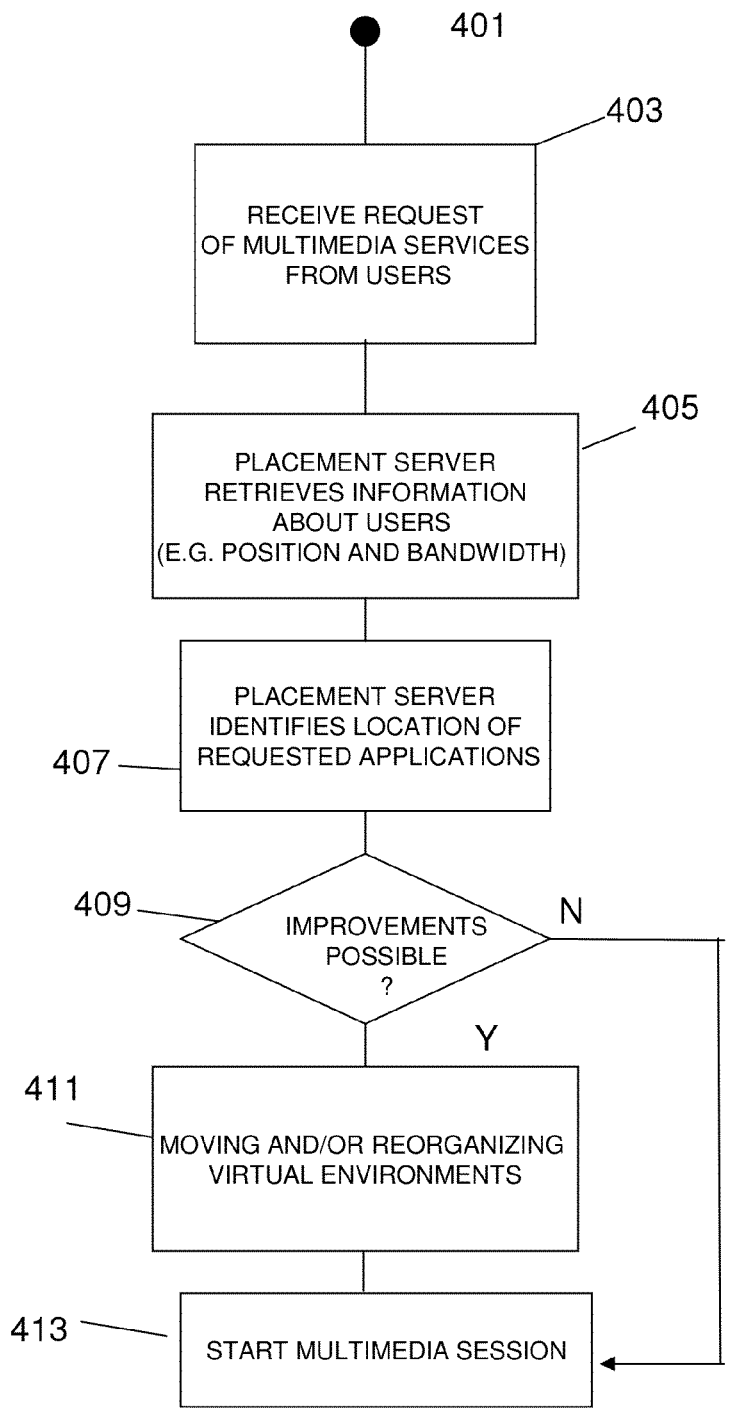
FIG. 4 shows a flowchart representing the steps to perform an example method in accordance with the present invention.

FIG. 4 schematically shows the method steps according to an example embodiment of the present invention. The process starts at step 401 and goes to step 403 where a request is received by one or more users to access a multimedia service of an IMS network as described above. This new request from a user is just one of several examples of events which can trigger the example method of the present invention. Other possibilities include, without limitation, an addition of new users to the connection, availability of a new remote server or in general any modification to the IMS network layout which allows a better distribution or organization of connections between servers and end users and a more efficient placement of virtual environments. Control continues to step 405, where a Placement Server (such as shown in FIG. 3) collects information about the one or more users that issued the request of step 403. Such information about the one or more users is available in a Presence Server as described above and may include information about the position of such users and the capabilities of users' equipment and connections (e.g., the bandwidth available to each user). The Placement Server also retrieves (step 407) information about the requested applications, e.g., where such applications are available, on which server and the transmission speed of the network connection between the server and the users. This information can be included in a repository within the Placement Server or it could be stored on an external repository accessible by the Placement Server. The Placement Server identifies those application servers including a multimedia application able to provide the requested multimedia service. The application server providing the best performances (e.g. having the minimum average distance from the users) is then selected. If such expected performances are not satisfactory (e.g., the average distance is greater than a predetermined threshold), the system attempts to identify better solutions. According to all information collected, the Placement Server can make an evaluation of possible re-arrangement of the IMS network in order to improve the speed and the efficiency of the multimedia services.

Following the example shown in FIG. 3, if the European users 303 request a specific gaming application and this application is available on a remote server (e.g. on the US Region Application Server), it would be much better to install or migrate a virtual image on the European Application Server. This is done by the Placement Server after an evaluation is performed based on the available parameters and information. Those skilled in the art will appreciate that several tools for optimizing workload and transmission can be used for this operation. Non-limiting examples of parameters which can be taken into consideration include:

Number of users connected from a specific zone;
Average communication bandwidth for the users connected from a specific zone;
Average Communication "distance" (e.g., the number of proxy servers) between the users connected from a specific zone and the IMS deployed service.

In the present example, the thresholds used to determine the need of a re-arrangement correspond to a "continental" distance. In other words, if it is not possible to find an application server with the requested application (and service) in the same continental zone (e.g. Europe), then a move of the application is needed. It is also possible to dynamically modify the network layout when one or more of the starting conditions change. Going back to the diagram of FIG. 4, if the Placement Server determines that an improvement is possible in the network organization, such improvement is implemented. In the example above, the requested gaming application can be moved from the US Application Server to the European Application Server (step 411) and subsequently the multimedia session is started (step 413). "Moving" an application means re-creating the same conditions which allow the requested multimedia service to be provided on a different application server. One skilled in the art will appreciate that this moving step can be implemented with several different techniques. According to an example embodiment of the present invention, the move corresponds to movement of a virtual image of the multimedia application. The virtual image move can be done in different ways according to the specific virtualization technology used. For example, the move can occur "on the fly" without performing any user interruption or, alternatively, the virtual environment could be suspended, moved and restored on the new system. If no improvement is possible or is not advantageous according to a predetermined thresholds parameter, the control goes directly to step 413 where the multimedia session is started.

Thus, the example embodiments of the present invention provide a method and system that exploits information about a user (e.g. position and characteristics of user's equipment) available in the Presence Server, for implementing a more efficient virtual environment to allocate IMS applications based upon currently connected users. It is possible to improve the efficiency of the IMS network by providing and managing IMS services (e.g., gaming services) based upon IMS workload and the position of the users connected, exploiting information about user location and users' device capabilities (e.g. in terms of bandwidth and distance).

Alterations and modifications may be made to the above without departing from the scope of the invention. Naturally, in order to satisfy local and specific requirements, a person skilled in the art may apply to the solution described above many modifications and alterations. Although the present invention has been described with a certain degree of particularity with reference to preferred embodiment(s) thereof, it should be understood that various omissions, substitutions and changes in the form and details as well as other embodiments are possible. Moreover, it is expressly intended that specific elements and/or method steps described in connection with any disclosed embodiment of the invention may be incorporated in any other embodiment as a general matter of design choice.

For example, similar considerations apply if the computers have different structure or include equivalent units. It is possible to replace the computers with any code execution entity (such as a PDA, a mobile phone, and the like).

Similar considerations also apply if the program (which may be used to implement each embodiment of the invention) is structured in a different way, or if additional modules or functions are provided.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The one or more example embodiments of the present invention provide a number of advantages including, without limitation, the leveraging of information about a user (e.g. position and characteristics of user's equipment) available in the Presence Server, for implementing a more efficient virtual environment to allocate IMS applications based on currently connected users. The presence information dynamically optimizes the allocation of the IMS Service plane applications, and Media Servers are deployed in a virtual environment. In an example embodiment, the optimization will occur both in terms of number of users connected from the same zone and the best available communication bandwidth.

Although embodiments of the present invention have been demonstrated in detail as examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. A computer-implemented method of providing predetermined multimedia services to a plurality of users through a IP Multimedia Subsystem (IMS), wherein the IMS comprises a presence server with a processor that maintains information about the plurality of users, the information about the plurality of users includes a position of each user, a plurality of application servers, wherein each application server includes a processor and at least one multimedia application configured to provide at least one multimedia service, and a placement server with a processor that has access to a repository containing information about the plurality of application servers and the associated multimedia applications, the information about the plurality of application servers and the associated multimedia applications including a position of each application server, the method comprising:

receiving a request at the placement server of a multimedia service by at least one of the plurality of users;

the placement server retrieving, from the presence server, presence information about the at least one user, wherein the presence information includes a position of the at least one user;

the placement server identifying application servers including a multimedia application that provides the requested multimedia service;

the placement server selecting a local application server based on the position of the at least one user included in the presence information retrieved from the presence server, such that the average distance between the at least one user and the selected local application server is less than a predetermined threshold;

creating a virtual image of the multimedia application from the identified application servers;

storing the virtual image on the local application server;

re-creating a set of conditions used by the multimedia application to provide the requested multimedia service on the selected local application server;

establishing a connection between the at least one user and the selected local application server; and providing to at least one of the plurality of users the requested multimedia service from the selected local application server using the virtual image of the multimedia application, wherein selecting the local application server so that the average distance between the at least one user and the selected local application server is less than the predetermined threshold is repeated each time a new request from a user is received for a multimedia service, and, responsive to a different local application server being selected, modifying an existing connection for the at least one user in the IMS.

2. The computer-implemented method of claim 1, wherein the placement server calculates an average distance between the identified application servers and the at least one user based upon a number of proxy servers between the identified application servers and the at least one user, the proxy servers being located in a communication network that comprises the IMS.

3. The computer-implemented method of claim 1, wherein the placement server calculates an average distance between the identified application servers and the at least one user based on a physical distance between the identified application servers and the at least one user.

4. The computer-implemented method of claim 3, wherein each user is assigned a parameter indicative of the user's communication characteristics, and the average distance is adjusted according to the assigned parameter.

5. The computer-implemented method of claim 1, wherein selecting a local application server includes selecting the local application server so that the average distance between the at least one user and the selected local application server is minimized.

6. The computer-implemented method of claim 5, wherein selecting the local application server so that the average distance between the at least one user and the selected local application server is minimized is repeated each time an IMS configuration changes and, responsive to a different local application server being selected, modifying an existing connection for the at least one user in the IMS.

7. The computer-implemented method of claim 1, wherein presence information about the at least one user comprises at least one of an audio device capability of each user's equipment, a video device capability of each user's equipment, a messaging device capability of each user's equipment, a connection characteristic of each user's equipment, a connection speed of each user's equipment, a bandwidth of each user's equipment, and a route from each user to application servers including intermediate proxy servers.

8. The computer-implemented method of claim 2, wherein each user is assigned a parameter indicative of the user's communication characteristics, and the average distance is adjusted according to the assigned parameter.

9. The computer-implemented method of claim 1, wherein multimedia services include gaming services.

10. The computer-implemented method of claim 1, wherein the at least one user comprises a plurality of users accessing the same multimedia service for use by the plurality of users.

11. An IP Multimedia Subsystem (IMS) for providing multimedia services to a plurality of users, the IMS comprising:
   a presence server comprising a processor that maintains presence information about the plurality of users, wherein the presence information includes position information of the plurality of users;
   a plurality of application servers, wherein each application server comprises a processor and includes at least one multimedia application configured to provide at least one multimedia service;
   a repository that includes information about the plurality of application servers and the associated multimedia applications, wherein the information about the plurality of application servers and the associated multimedia applications includes a position of each application server;
   a placement server comprising a processor that has access to the repository and the presence server and is further configured such that, upon receipt of a request of a multimedia service by at least one of the plurality of users, the placement server is configured to:
      identify application servers that include a multimedia application that provides the requested multimedia service;
      select a local application server based on the position information of the plurality of users included in the presence information, such that the average distance between at least one user and the selected local application server is less than a predetermined threshold;
      create a virtual image of the multimedia application from the identified application servers;
      store the virtual image on the local application server;
      wherein selecting the local application server so that the average distance between the at least one user and the selected local application server is less than the predetermined threshold is repeated each time a new request from a user is received for a multimedia service, and, responsive to a different local application server being selected, modifying an existing connection for the at least one user in the IMS
   the local application server comprising a processor that is configured to re-create a set of conditions used by the multimedia application to provide the requested multimedia service on the selected local application server;
   a network configured to establish a connection between the at least one user and the local application server, wherein the network connection provides the requested multimedia service based on the virtual image of the multimedia application to the at least one user.

12. The IP Multimedia Subsystem (IMS) of claim 11, wherein the placement server receives the request of the same multimedia service from a plurality of users for use by the plurality of users.

13. A computer program product for performing a method of providing predetermined multimedia services to a plurality of users through a IP Multimedia Subsystem (IMS), wherein the IMS comprises a presence server to maintain information about the plurality of users, the information about the plurality of users including a position of each user, a plurality of application servers, each application server including at least one multimedia application configured to provide at least one multimedia service, and a placement server that has access to a repository containing information about the plurality of application servers and the associated multimedia applications, the information about the plurality of application servers and the associated multimedia applications including a position of each application server, the computer program product comprising:
   a tangible computer readable storage device having computer readable program code embodied therewith, the computer readable program code configured to execute a method on a data processing system, the method comprising:
   receiving a request of a multimedia service by at least one of the plurality of users;
   retrieving, from the presence server, presence information about the at least one user, wherein the presence information includes a position of the at least one user;
   identifying application servers including a multimedia application that provide the requested multimedia service;
   selecting a local application server based on the position of the at least one user included in the presence information retrieved from the presence server;
   creating a virtual image of the multimedia application from the identified application servers;
   storing the virtual image on the local application server to re-create a set of conditions used by the multimedia application to provide the requested multimedia service on the selected local application server;
   establishing a connection between the at least one user and the selected application server; and
   providing to at least one of the plurality of users the requested multimedia service from the selected local application server using the virtual image of the multimedia application,
   wherein selecting the local application server so that the average distance between the at least one user and the selected local application server is less than the predetermined threshold is repeated each time a new request from a user is received for a multimedia service, and, responsive to a different local application server being selected, modifying an existing connection for the at least one user in the IMS.

14. The computer program product of claim 13, wherein computer readable program code is configured to execute the method on the data processing system such that the request of the same multimedia service is received from a plurality of users for use by the plurality of users.

* * * * *